(12) United States Patent
Jung et al.

(10) Patent No.: US 12,271,724 B2
(45) Date of Patent: Apr. 8, 2025

(54) METHOD FOR UPDATING SOFTWARE BY CONFIRMING HARDWARE VERSION INFORMATION

(71) Applicant: LG ENERGY SOLUTION, LTD., Seoul (KR)

(72) Inventors: Jin Kyu Jung, Daejeon (KR); Yeon Ok Yi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/027,007

(22) PCT Filed: Jun. 10, 2022

(86) PCT No.: PCT/KR2022/008244
§ 371 (c)(1),
(2) Date: Mar. 17, 2023

(87) PCT Pub. No.: WO2023/277386
PCT Pub. Date: Jan. 5, 2023

(65) Prior Publication Data
US 2023/0367578 A1  Nov. 16, 2023

(30) Foreign Application Priority Data
Jun. 28, 2021  (KR) ........................ 10-2021-0084131

(51) Int. Cl.
*G06F 9/44* (2018.01)
*G06F 8/65* (2018.01)
*G06F 8/71* (2018.01)

(52) U.S. Cl.
CPC . *G06F 8/65* (2013.01); *G06F 8/71* (2013.01)

(58) Field of Classification Search
CPC ....................................................... G06F 8/65
(Continued)

(56) References Cited

U.S. PATENT DOCUMENTS 10,095,559 B2 * 10/2018 Gambardella ...... G06F 11/0793
11,669,322 B2 *  6/2023 Nolan ..................... G06F 8/65
717/168

(Continued)

FOREIGN PATENT DOCUMENTS

JP    2003-122574 A    4/2003
JP    2007-257417 A    10/2007
(Continued)

OTHER PUBLICATIONS

Anonymous, "Multiplexer," Wikipedia, The Free Encyclopedia, Jun. 22, 2021, pp. 1-8.
(Continued)

*Primary Examiner* — Evral E Bodden
(74) *Attorney, Agent, or Firm* — Birch, Stewart, Kolasch & Birch, LLP

(57) ABSTRACT

The present invention is to identify a hardware version capable of performing a software update and does not store the version information in the hardware in the code, but inputs the version information to the microcontroller through the hardware version identification unit that stores the BMS hardware version information. Also, in order to compensate for the low channel utilization of the microcontroller when one microcontroller is used for software update, it is a device and method for operating in both the application mode and the boot mode.

11 Claims, 3 Drawing Sheets

(58) Field of Classification Search
USPC .......................................................... 717/168
See application file for complete search history.

(56) References Cited

U.S. PATENT DOCUMENTS

| | | | |
|---|---|---|---|
| 2005/0108700 | A1 | 5/2005 | Chen et al. |
| 2008/0250403 | A1 | 10/2008 | Moon et al. |
| 2012/0297211 | A1 | 11/2012 | Lee |
| 2020/0167249 | A1 | 5/2020 | Yamana et al. |
| 2021/0034354 | A1 | 2/2021 | Lee et al. |
| 2021/0155177 | A1 | 5/2021 | Harata et al. |

FOREIGN PATENT DOCUMENTS

| | | |
|---|---|---|
| JP | 2008-55980 A | 3/2008 |
| JP | 2014-108657 A | 6/2014 |
| JP | 2020-27628 A | 2/2020 |
| JP | 2020-86805 A | 6/2020 |
| KR | 10-0487241 B1 | 8/2005 |
| KR | 10-2006-0064397 A | 6/2006 |
| KR | 10-0624723 B1 | 9/2006 |
| KR | 20080090939 A * | 4/2007 |
| KR | 10-2008-0090939 A | 10/2008 |
| KR | 20130045508 A * | 10/2011 |
| KR | 10-1172915 A | 8/2012 |
| KR | 10-2013-0045508 A | 5/2013 |
| KR | 10-1498756 B1 | 3/2015 |
| KR | 20190109979 * | 3/2018 |
| KR | 10-2019-0109979 A | 9/2019 |
| KR | 10-2020-0059965 A | 5/2020 |
| KR | 10-2236058 B1 | 4/2021 |

OTHER PUBLICATIONS

Extended European Search Report for European Application No. 22833442.1, dated Feb. 15, 2024.
International Search Report for PCT/KR2022/008244 (PCT/ISA/210) mailed on Aug. 25, 2022.

* cited by examiner

METHOD FOR UPDATING SOFTWARE BY CONFIRMING HARDWARE VERSION INFORMATION

CROSS REFERENCE TO RELATED APPLICATIONS

This application is the National Phase of PCT/KR2022/008244 filed on Jun. 10, 2022, which claims priority under 35 U.S.C. § 119 (a) to No. 10-2021-0084131 filed on Jun. 28, 2021 in the Republic of Korea, all of which are hereby expressly incorporated by reference into the present application.

TECHNICAL FIELD

The present invention relates to a method of confirming a hardware version for software update when a software update of a BMS is performed. The present invention relates to a device and method for increasing channel utilization of microcontrollers while accurately identifying hardware versions.

BACKGROUND ART

The hardware version varies depending on the application devices and circuits constituting the Battery Management System (BMS). To compensate for problems or losses that occurred in the previous version, the hardware version is updated as a new BMS is manufactured by supplementing the PCB board manufacturing and application devices of the BMS. This may also be referred to as a hardware update.

The software version update proceeds according to the update of the digital controller design for the control and protection circuit operation of each application of the BMS. This may also be referred to as a software update.

There is a hardware version to which a software version may be applied, and there is a hardware version that may be applied even when updating software. Therefore, when updating the software, the hardware version should be checked.

Prior literature Korean Patent No. 10-0624723 (Sep. 8, 2006) is a prior art of the present invention, and stores the hardware version in the bootloader code, and when checking the hardware version, it is checked through the bootloader code.

Therefore, if wanting to check the hardware version when updating the software, by accessing the bootloader code and comparing them, the hardware is checked and after that, the software update will proceed.

In this case, as the hardware version is directly input and stored in the bootloader code, errors and accidents may occur due to incorrect entries.

(Patent Document 1) Korean Patent Registration 10-0624723 (2006.09.08.)

DISCLOSURE OF THE INVENTION

Technical Problem

In order to solve the above problems, the present invention provides a device and method for updating software of a battery management system (BMS) using hardware version information stored in a separate hardware version information identification device so that an error does not occur during hardware version identification.

Technical Solution

In order to achieve the above object, the present invention provides a battery management device including: a hardware version identification unit including hardware version information of a battery management system (BMS) and configured to output the hardware version information; and a microcontroller including a plurality of input/output channels, and configured to receive the hardware version information of the hardware version identification unit through at least one input/output channel among the plurality of input/output channels, receive updated software including a compatible hardware version list, and compare the compatible hardware version list with hardware version information of the BMS received from the hardware version identification unit to determine whether to proceed with a software update of the BMS.

In addition, at least one input/output channel of the microcontroller among the plurality of input/output channels is set as a designated channel, wherein the designated channel is simultaneously connected to a first switch having one end connected to a predetermined application execution unit and a second switch having one end connected to the hardware version identification unit, wherein each of the first switch and the second switch has an on/off state set differently according to a control of the microcontroller.

Moreover, when there is a software update instruction, the microcontroller turns on the second switch and turns off the first switch to receive hardware version information input from the hardware version identification unit through the designated channel.

Furthermore, the microcontroller is further configured to include a control terminal for outputting an on/off control command to the first and second switches, and the control terminal outputs a control signal for turning on the first switch and turning off the second switch in a regular mode or an application operation mode.

In addition, when update software is received by the microcontroller, the microcontroller compares a compatible hardware version list included in the update software with the hardware version information received from the hardware version identification unit, and controls on/off of the first and second switches according to a comparison result.

A control method of a battery management device of the present invention includes: an update software reception step of receiving update software for updating software of a battery management system (BMS) BMS; a hardware version information acquisition step of acquiring hardware version information of the BMS stored in a hardware version identification unit of the BMS; a hardware version list check step of comparing the acquired hardware version information with a compatible hardware version list included in the update software to determine whether to proceed with the software update; a boot mode starting step of starting a boot mode for updating software when the hardware version information of the BMS is included in the compatible hardware version list; and a boot mode ending step of exiting the boot mode when the software update is finished.

The hardware version information acquisition step is to acquire the hardware version identification information stored in the hardware version identification unit by controlling the second switch to be turned on connecting the hardware version identification unit and a designated channel of the microcontroller, and controlling the first switch to be turned off connecting the designated channel and a predetermined application.

In addition, when as a result of checking in the hardware version list check step, the hardware version information of the BMS is not included in the compatible hardware version list, the first switch is turned on and the second switch is turned off to proceed with an application mode.

Advantageous Effects

In the present invention, by using a separate hardware version information identification device storing hardware version information, it is possible to prevent errors due to incorrect hardware version input during software update.

In addition, by setting a predetermined application channel as a designated channel, and connecting the application element and the element having hardware version information to one designated channel, a method and device are provided, which eliminate the need to check the version through the boot code during software update and do not require separate hardware version management while performing software update mode and application mode through one channel.

BRIEF DESCRIPTION OF THE DRAWINGS

FIG. 3 is a view showing a list of hardware versions compatible with software update.

MODE FOR CARRYING OUT THE INVENTION

Figure 1:
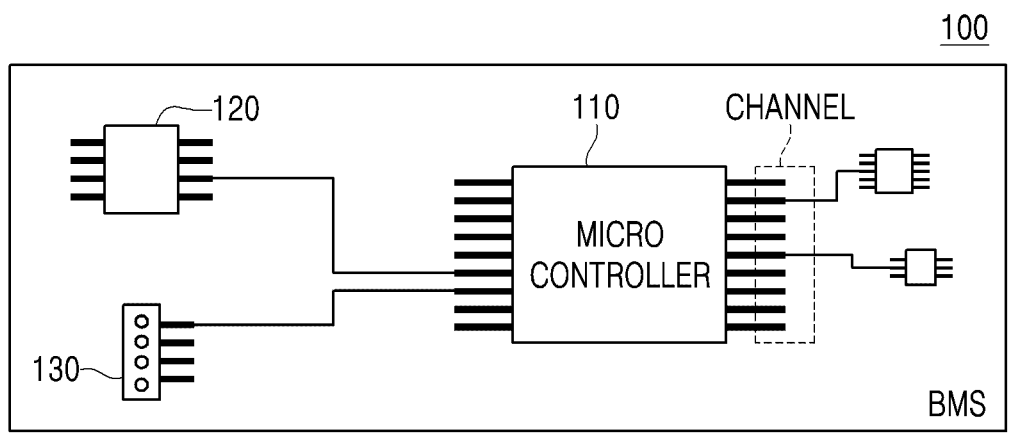
FIG. 1 shows a BMS board 100 according to a first embodiment of the present invention.

Hereinafter, embodiments of the present invention will be described in detail with reference to the accompanying drawings so that those of ordinary skill in the art may easily implement the present invention. However, the present invention may be implemented in various forms and is not limited to the embodiments described herein. In the drawings, parts irrelevant to the description are omitted in order to clearly describe the present invention, and like reference numerals refer to like elements throughout the specification.

1. PRIOR ART

The hardware version update will be described in detail below, for example, in a BMS system. The BMS system consists of a number of elements that constitute a temperature measuring device, microcontroller, protection circuit, and power converter, and these elements constitute the circuit.

At this time, the loss of the BMS system increases or stability is determined according to the improvement of the performance of each element or the circuit configuration. In order to improve this problem, as some elements and circuits in the system are modified, the hardware is changed, and this is called a hardware version update.

Improving the way switches control and code to drive a hardware system is called a software update.

For this reason, conventionally, for software update, one's own hardware version is stored in the boot code (code is a generic term for the programming language that makes the microcontroller function) and stored in the microcontroller's flash memory. At this time, since the hardware version is directly input and managed in the boot code, the hardware system may not operate correctly due to an error in the version, which may cause an accident. Also, since it is stored in the microcontroller's memory, there is a problem that it is difficult to check it from time to time.

2. DEVICE FOR CHECKING HARDWARE VERSION OF PRESENT INVENTION

FIG. 1 shows a first embodiment of the present invention in which information on the hardware version of the BMS is recorded in hardware by improving the above-described problem, and then provided directly through the channel of the microcontroller when software is updated.

FIG. 1 shows a first embodiment of the present invention in which information on the hardware version of the battery management system (BMS) (i.e., BMS board 100) is recorded in hardware by improving the above-described problem, and then provided directly through the channel of the microcontroller when software is updated.

A hardware version identification unit 130 is configured to provide the hardware version information of the BMS from the hardware version identification unit 130 when updating the software, and compare the received hardware version information with the list of compatible hardware versions included in the software for update so as to determine whether to proceed with the software update. That is, the hardware version list is a list of hardware versions for which software is to be processed.

The software update procedure follows the same procedure as in the second embodiment to be described later.

On the other hand, the microcontroller has a limited number of channels, and as the hardware version of the BMS is updated, more channels of the microcontroller are required. The analog method of directly inputting the hardware version through the microcontroller uses the microcontroller channel only in software update mode (or boot mode), so there is a problem in that channel utilization is low.

Figure 2:
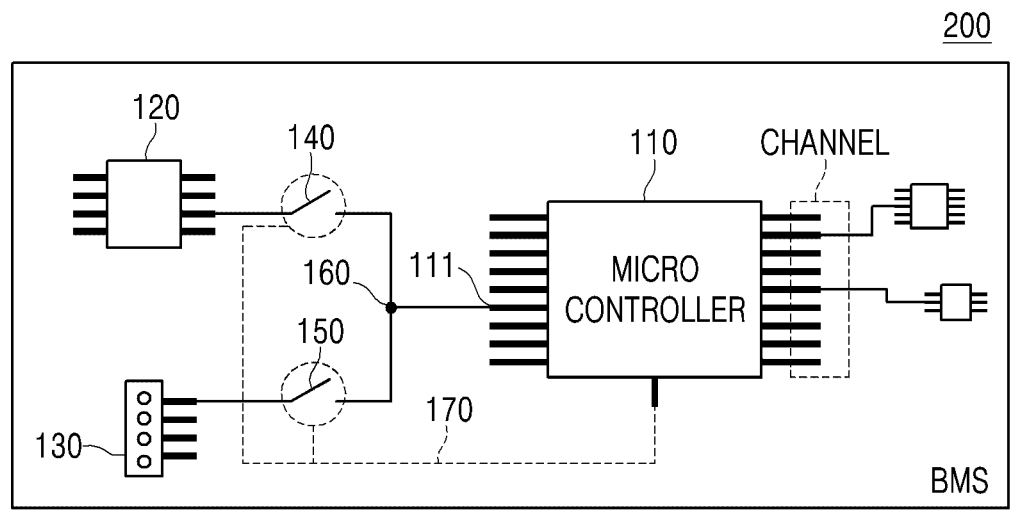
FIG. 2 shows a BMS board 200 according to a second embodiment of the present invention.

In order to overcome the channel utilization problem, the second embodiment of the present invention has a circuit configuration as shown in FIG. 2.

The embodiment of FIG. 2 relates to a BMS board 200 and a method of increasing channel utilization while receiving hardware version information through a channel of a microcontroller.

It is an invention that enables both hardware version identification in boot mode and application execution in application mode by mounting two switches 140 and 150 that operate complementary to one channel of the microcontroller and controlling the operation according to each mode.

According to the present invention, the battery management device includes a first switch for inputting and outputting information according to operations of a microcontroller, an application execution unit, a hardware version identification unit, and a second switch for operating the hardware version identification unit.

2.1. Microcontroller (MCU) 110

A microcontroller (MCU) 110 is an ultra-small arithmetic processing device and is a device that receives and stores data such as battery current, voltage, temperature, etc. detected by multiple sensors that check the SOC of the battery in the BMS and enables a protection circuit operation and battery switch on/off control.

Accordingly, in order to improve the control function of the BMS, the software of the microcontroller 110 is updated.

In addition, the microcontroller 110 serves to control a boot mode and an application mode for software update of the BMS. (The application mode is a mode in which applications required for BMS generally operate.)

It is a device that instructs the operation of an application element through the designated channel 111 or transmits a control signal to the control terminal 170.

Figure 3:
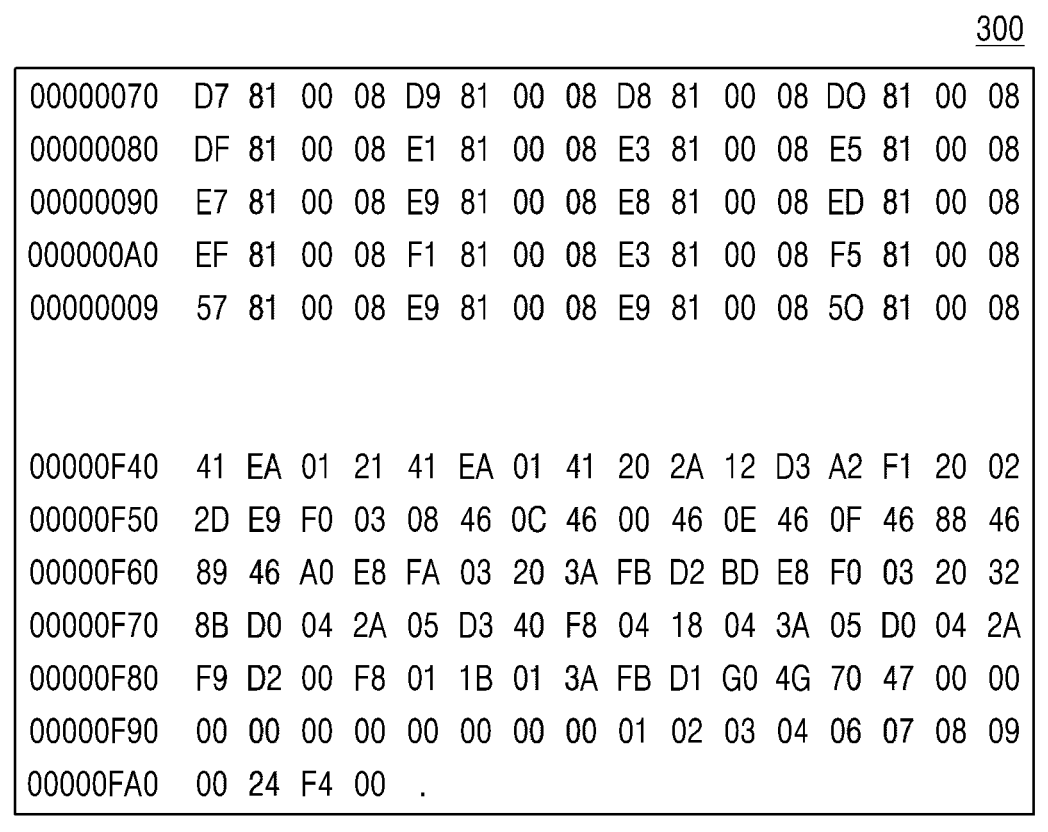

In addition, the microcontroller receives the software for the update when the software version is updated. The software for update includes a list of compatible hardware versions (also called a list of compatible hardware versions). FIG. 3 shows a compatible hardware version list 300 received by the microcontroller in the present invention.

After receiving the hardware version information input through the hardware version identification unit 130 to be described later from the microcontroller through the designated channel 111, the received hardware version information is compared with the hardware version list 300. The hardware version identification unit 130 stores hardware version information of a BMS including a microcontroller to be software updated, and outputs hardware version information to the microcontroller according to an on operation of a second switch to be described later.

Accordingly, if the hardware version input through the hardware version identification unit 130 does not exist in the hardware version list 300, the software update does not proceed.

Conversely, if the hardware version input through the hardware version identification unit 130 exists in the hardware version list 300, the software update proceeds.

A device that performs this process is the microcontroller 110.

2.2. Application Execution Unit 120

The application execution unit is a device that is connected to the microcontroller (MCU) 110 and the application element operates. The application execution unit 120 is a device operating in the application mode (or regular mode), and is a device that stops when a software update command is input and operates again when the software update is completed. The application execution unit 120 is connected to the first switch 140 to input information or output an operation to the microcontroller through the designated channel 111.

2.3. First Switch 140

It is a switch to connect the designated channel of the application execution unit and the microcontroller, and is a device that allows the application execution unit 120 and the microcontroller 110 to be connected in an application mode (or regular mode) in which the software update is completed or the update is not performed.

2.4. Hardware Version Identification Unit 130

The hardware version identification unit 130 is a device that provides data about the hardware version to the microcontroller 110. The hardware version identification unit 130 stores hardware information of the BMS, and is connected to a second switch 150 to be described later, and when the software update command is input, the second switch 150 is turned on and BMS hardware version information is provided to the microcontroller 110. The difference in the first embodiment is that the hardware version identification unit 130 directly outputs hardware version information to the microcontroller through an independent channel as shown in FIG. 1.

The hardware version identification unit 130 may input a combination of High or Low signals coded according to hardware version information to the microcontroller 110, or input hardware version information to the microcontroller 110 by changing the current value applied to the microcontroller 110.

The output of the hardware version identification unit 130 is connected to one channel of the microcontroller and outputs the version of the BMS to the microcontroller, and since it is configured to occupy a separate channel and version identification is only used for software updates in the first embodiment, in the second embodiment, in terms of channel resource utilization, the circuit is configured in such a way that the channel of the microcontroller occupied by other applications is shared.

2.5. Second Switch 150

It is a switch that operates when a BMS software update command is applied externally or internally. It electrically connects the designated channel 111 of the microcontroller and the hardware version identification unit 130, and allows the hardware version information applied from the hardware version identification unit 130 to be input to the microcontroller 110 only during software update. The first switch 140 and the second switch 150 operate complementary to each other, and when the second switch 150 is turned on, the first switch 140 is turned off.

One end of the second switch 150 is connected to the hardware version identification unit 130, and the other end is connected to the connection part 160.

2.6. Control Terminal 170

It is to control the first switch 140 and the second switch 150, and outputs a control signal to turn off the first switch 140 and turn on the second switch 150 through one control terminal 170 when a software update command is input from the microcontroller 110.

It is a terminal for outputting a control signal for turning the first switch 140 on and the second switch 150 off during the application mode operation.

2.7. First Switch and Second Switch Connection Part 160

One ends of the first switch 140 and the second switch 150 are respectively connected to the application execution unit 120 and the hardware version identification unit 130, and the other end of each of the first switch 140 and the second switch 150 is connected to one end of the connection part 160.

The other end of the connection part 160 is connected to one designated channel 111 of the microcontroller 110.

Through such a circuit configuration, according to the on/off of the first switch 140 and the second switch 150, one of the data of the application execution unit 120 and the hardware version identification unit is selectively input to the one channel 111 of the microcontroller 110.

According to one embodiment of the present invention, the switch is controlled such that in the regular mode or application mode of the battery management device, the first switch 140 is controlled on, and signals and information are input/output to the application execution unit 120 by the designated channel 111, and in the boot mode, the first switch 140 is controlled off and the second switch 150 is controlled on and thus hardware version information input through the hardware version identification unit 130 is input to the microcontroller 110 through the designated channel 111.

3. METHOD OF CHECKING HARDWARE VERSION OF PRESENT INVENTION

Figure 4:
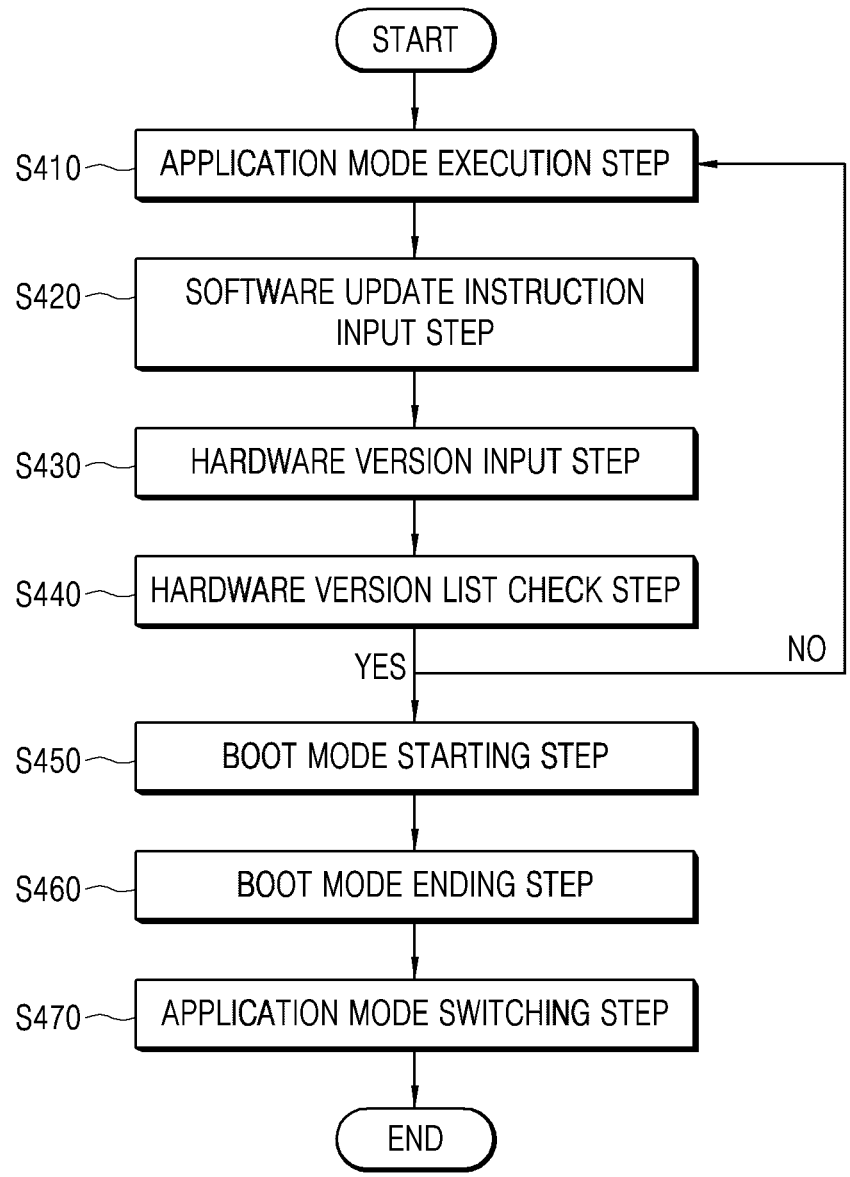
FIG. 4 is a flowchart of a software update of the present invention.

The present invention relates to a method of checking a hardware version when a software update of a microcontroller is performed. FIG. 4 shows an example of the method of the present invention.

A mode for performing a software update is called a boot mode, and a mode in which each application operates according to a necessary situation is called an application mode (or regular mode).

3.1. Application Mode Execution Step S410

It is a step of inputting or outputting application information by turning on the first switch 140 of FIG. 2 to execute an application by the application execution unit.

This is a step in which the second switch is OFF, so that the hardware version information provided from the hardware version identification unit is not transmitted to the microcontroller.

3.2. Software Update Instruction Input Step S420

This is a step in which a command to proceed with software update of the BMS is inputted from the outside or the inside, and accordingly, is a step to prepare for boot mode operation. This step of inputting the software update command receives the software for updating for software update of the BMS, which is also referred to as the step of receiving update software.

This is a step of turning off the first switch 140 and turning on the second switch 150. The on/off of the first and second switches is controlled through the control terminal 170 of the above-described microcontroller.

In addition, it is a step of receiving the hardware version list 300 to be updated with the software update command input together with the command. At this time, the hardware version list 300 (also referred to as a compatible hardware version list) is stored as an image file to facilitate access and management.

3.3. Hardware Version Input Step S430

It is a step in which the hardware version in the hardware version identification unit 130 is input to the microcontroller 110 as the second switch 150 is turned on. This is a step in which BMS hardware version information stored in the hardware version identification unit 130 is input to the microcontroller 110 through the designated channel 111. The hardware version input step is to obtain hardware version information of the BMS, and is also referred to as a hardware version information acquisition step.

The hardware version identification method transmits a hardware identification signal to the microcontroller 110 by outputting a high/low current or voltage, and a current value change through a hardware version identification unit.

In the first embodiment, when receiving the above-described software update command, hardware version information is directly received from a channel connected to the hardware version identification unit 130.

3.4. Hardware Version List Check Step S440

It is a step of determining whether to proceed with software update by comparing the BMS hardware version information input to the designated channel 111 through the above-described hardware version input step with the hardware version list 300 included in the received software update file.

The hardware version list 300 included in the software update file may be received in advance and stored as an image file in a predetermined area of the microcontroller.

When the hardware version information acquired in the hardware version input step or the hardware version information acquisition step exists in the hardware version list, the boot mode starts.

If the hardware version information is not in the hardware version list, it switches to the application mode.

If the hardware version authorized through the designated channel 111 exists in the hardware version list 300, software update is performed.

In order to proceed with the software update, in the boot mode starting step below, the first switch 140 maintains an off state, and the second switch 150 maintains an on state.

If the hardware version information authorized through the designated channel 111 does not exist in the hardware version list 300, the software update is not performed. Accordingly, the second switch 150 is turned off, and the first switch 140 is turned on to proceed to the application mode (or regular mode). Hardware version information is no longer transmitted to the microcontroller 110.

3.5. Boot Mode Switching

When the hardware version information obtained through the hardware version input step exists in the list of hardware versions to be updated, the software update is performed.

3.5.1. Boot Mode Starting Step S450

This is a step in which software and hardware of the BMS are switched to a mode for software update, and only devices necessary for software update are operated, and devices not required for software update are switched to sleep mode (or turned off). After that, it is a step to proceed with the software update of the BMS.

When information on boot mode start is input in the boot mode starting step S450, the microcontroller 110 instructs mode switching according to the boot mode. Through the control terminal 170, the first switch 140 is controlled to keep it on, and the second switch 150 is controlled to keep it off. In addition, other applications and software also proceed to the boot mode.

3.5.2. Boot Mode Ending Step S460

This is a step to stop the boot mode when a command indicating that the software update of the BMS is complete is input from the inside of the micro controller 110.

Through the control terminal 170, the second switch 150 is turned off, and the first switch 140 is on.

3.6. Application Mode Switching Step S470

After exiting the boot mode, the original application mode (or regular mode) is started. Accordingly, the second switch 150 is turned off, and the designated channel 111 of the microcontroller is connected to the application execution unit 120 to input or output information required for application execution.

On the other hand, although the technical idea of the present invention has been specifically described according to the above embodiment, it should be noted that the above embodiments are for the purpose of explanation and not limitation. In addition, those skilled in the art in the technical field of the present invention will be able to understand that various embodiments are possible within the scope of the spirit of the present invention.

The invention claimed is:

1. A battery management device comprising:
a hardware version identification unit including hardware version information of a battery management system (BMS) and configured to output the hardware version information;
a microcontroller including a plurality of input/output channels, and configured to:
receive the hardware version information of the hardware version identification unit through at least one input/output channel among the plurality of input/output channels,
receive updated software including a compatible hardware version list,
compare the compatible hardware version list with the hardware version information of the BMS received from the hardware version identification unit to determine whether to proceed with a software update of the BMS, and perform the software update, when it is determined that the compatible hardware version list is compatible with the hardware version information of the BMS; and a second switch disposed between the hardware version identification unit and the microcontroller, wherein, when the microcontroller receives the updated software including the compatible hardware version, the microcontroller controls the second switch to close, thereby forming a connection between the hardware version identification unit and the microcontroller.

2. The battery management device of claim 1, wherein at least one input/output channel of the microcontroller among the plurality of input/output channels is set as a designated channel, wherein the designated channel is simultaneously connected to a first switch having one end connected to a predetermined application execution unit and the second switch having one end connected to the hardware version identification unit, and wherein each of the first switch and the second switch has an on/off state set differently according to a control of the microcontroller.

3. The battery management device of claim 2, wherein when there is a software update instruction, the microcontroller turns on the second switch and turns off the first switch to receive information on hardware version input from the hardware version identification unit through the designated channel.

4. The battery management device of claim 3, wherein the microcontroller is further configured to include a control terminal for outputting an on/off control command to the first and second switches, and wherein the control terminal outputs a control signal for turning on the first switch and turning off the second switch in a regular mode or an application operation mode.

5. The battery management device of claim 3, wherein when the updated software is received by the microcontroller, the microcontroller compares the compatible hardware version list included in the updated software with the hardware version information received from the hardware version identification unit, and controls on/off of the first and second switches according to a comparison result.

6. A method of controlling a battery management device, the method comprising:

receiving update software for updating software of a battery management system (BMS), by a microcontroller;

acquiring hardware version information of the BMS stored in a hardware version identification unit of the BMS, by the microcontroller;

comparing the hardware version information with a compatible hardware version list included in the update software to determine whether to proceed with a software update, by the microcontroller;

starting a boot mode for updating software when the hardware version information of the BMS is included in the compatible hardware version list, by the microcontroller; and of exiting the boot mode when the software update is finished, by the microcontroller, wherein a second switch is disposed between the hardware version identification unit and the microcontroller, and wherein, when the microcontroller receives the updated software including the compatible hardware version, the microcontroller controls the second switch to close, thereby forming a connection between the hardware version identification unit and the microcontroller.

7. The method of claim 6, wherein the acquiring the hardware version information of the BMS includes acquiring hardware version identification information stored in the hardware version identification unit by controlling the second switch to be turned on connecting the hardware version identification unit and a designated channel of the microcontroller, and controlling a first switch to be turned off connecting the designated channel and a predetermined application execution unit.

8. The method of claim 7, wherein as a result of checking in the comparing the hardware version information with the compatible hardware version list, when the hardware version information of the BMS is not included in the compatible hardware version list, the first switch is turned on and the second switch is turned off to proceed with an application mode.

9. The battery management device of claim 2, wherein if the first switch is connected to the designated channel, the second switch is disconnected, and if the second switch is connected to the designated channel, the first switch is disconnected.

10. The battery management device of claim 9, wherein the second switch is connected to the designated channel after the microcontroller receives the updated software, and wherein the first switch is connected to the designated channel in a regular mode.

11. The battery management device of claim 2, wherein the microcontroller further includes a control terminal for outputting an on/off control command to the first and second switches, and wherein the control terminal outputs a control signal for turning off the first switch and turning on the second switch in a software update mode.

* * * * *